(12) United States Patent
Gibson et al.

(10) Patent No.: US 10,918,951 B1
(45) Date of Patent: Feb. 16, 2021

(54) SYSTEMS AND METHODS TO PROVIDE A GAME BASED ON COMMON MEDIA CONSUMPTION

(71) Applicant: Disney Enterprises, Inc., Burbank, CA (US)

(72) Inventors: Hunter Gibson, Burbank, CA (US); Janice Rosenthal, Burbank, CA (US); Nathan Nocon, Burbank, CA (US); Michael Goslin, Burbank, CA (US); Elliott Baumbach, Burbank, CA (US); Jason Yeung, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/570,147

(22) Filed: Sep. 13, 2019

(51) Int. Cl.
  *A63F 13/60* (2014.01)
  *A63F 13/79* (2014.01)
  *A63F 13/95* (2014.01)
  *H04L 29/06* (2006.01)
  *A63F 13/48* (2014.01)

(52) U.S. Cl.
  CPC ............. *A63F 13/60* (2014.09); *A63F 13/48* (2014.09); *A63F 13/79* (2014.09); *A63F 13/95* (2014.09); *H04L 29/06034* (2013.01)

(58) Field of Classification Search
  None
  See application file for complete search history.

(56) References Cited

U.S. PATENT DOCUMENTS

| | | | | |
|---|---|---|---|---|
| 2006/0003824 A1* | 1/2006 | Kobayashi | ............... | A63F 13/12 463/1 |
| 2006/0135264 A1* | 6/2006 | Shaw | .................... | A63F 13/795 463/42 |
| 2006/0287096 A1* | 12/2006 | O'Kelley, II | ....... | G07F 17/3276 463/42 |
| 2009/0075738 A1* | 3/2009 | Pearce | .................... | G07F 17/32 463/42 |
| 2013/0344968 A1* | 12/2013 | Halfteck | ................ | A61B 5/167 463/43 |
| 2015/0105145 A1* | 4/2015 | Scheer | .................. | A63F 13/335 463/29 |

* cited by examiner

*Primary Examiner* — Jason T Yen
(74) *Attorney, Agent, or Firm* — Esplin & Associaates, PC

(57) ABSTRACT

Systems and methods to provide a game based on common media consumption are described herein. Exemplary implementations may: obtain sets of consumption information for users of a game; identify common media content that has been consumed by two or more users from the sets of consumption information for the two or more users; responsive to requests from users to play the game together, obtain game information that corresponds to the common media content; effectuate presentation of the game on computing platforms of the users based on the game information; and/or perform other operations.

20 Claims, 3 Drawing Sheets

US 10,918,951 B1

SYSTEMS AND METHODS TO PROVIDE A GAME BASED ON COMMON MEDIA CONSUMPTION

FIELD OF THE DISCLOSURE

The present disclosure relates to provide a game based on common media consumption.

BACKGROUND

There are various trivia games that quiz players on TV shows, movies, actors, and/or other media content.

SUMMARY

One aspect of the present disclosure relates to provide a game based on common media consumption. Various trivia games may quiz players on media content. However, when one or more players may not have actually consumed the media content, it might not be as fun or fair. A game of the present disclosure may be generated for a group of users based on their collective media consumption. For example, the game may comprise of a trivia game with questions generated about commonly consumed media content.

One or more implementations of a system configured to provide a game based on common media consumption may include one or more hardware processors configured by machine-readable instructions. The processor(s) may be configured to obtain sets of consumption information for users of the game. The sets of consumption information may specify individual sets of media content consumed by individual users. By way of non-limiting illustration, the sets of consumption information may include one or more of a first set of consumption information for a first user, a second set of consumption information for a second user, and/or other sets of consumption information for other users. The first set of consumption information may specify a first set of media content that has been consumed by the first user. The second set of consumption information may specify a second set of media content that has been consumed by the second user.

The processor(s) may be configured to identify common media content that has been consumed by two or more users from the sets of consumption information for the two or more users. By way of non-limiting illustration, common media content between the first user and the second user may be identified. The common media content between the first user and the second user may include media content that is common between the first set of media content and the second set of media content.

The processor(s) may be configured to, responsive to obtaining requests from users to play the game together, obtain game information that corresponds to the common media content between the users requesting to play the game together. The game information corresponding to the common media content may define game content associated with the common media content. By way of non-limiting illustration, responsive to a request from the first user and the second user to play the game together, first game information defining first game content may be obtained. The first game content may be associated with the common media content between the first user and the second user.

The processor(s) may be configured to effectuate presentation of the game on computing platforms of the users based on the game information and/or other information. By way of non-limiting illustration, the game including the first game information may be presented on one or more of a first computing platform associated with the first user, a second computing platform associated with the second user, and/or other computing platforms.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
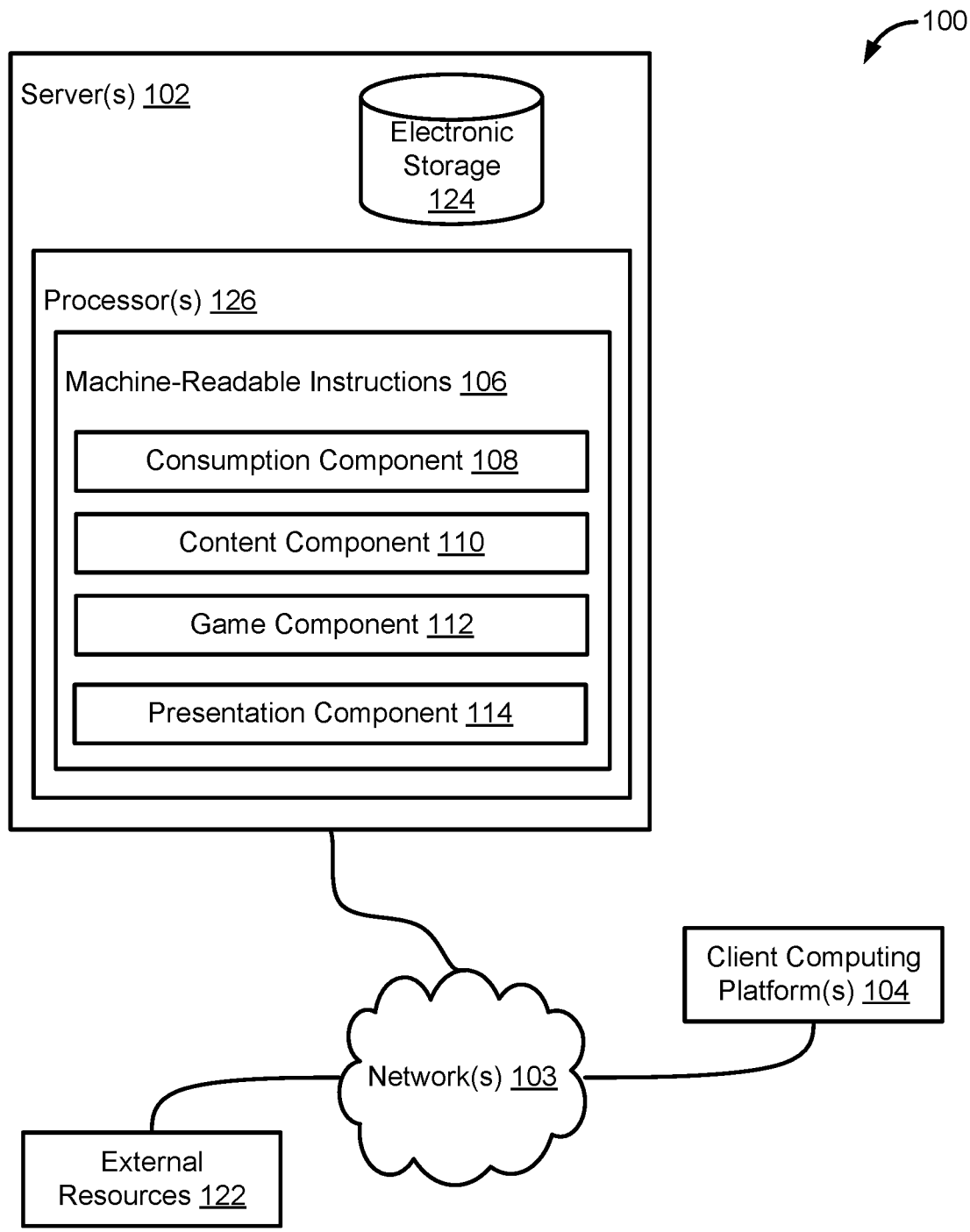
FIG. 1 illustrates a system configured to provide a game based on common media consumption, in accordance with one or more implementations.

FIG. 1 illustrates a system 100 configured to provide a game based on common media consumption, in accordance with one or more implementations. A game of the present disclosure may be generated for a group of user based on their collective media consumption. For example, the game may comprise a trivia game with questions generated about commonly consumed media content. In some implementations, media content may include one or more of movies, games, books, videos and/or video clips, sporting events, photos, memes, news, and/or other media content.

In some implementations, system 100 may include one or more of one or more servers 102, one or more client computing platforms 104, external resources 122, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via individual ones of the client computing platform(s) 104.

Server(s) 102 may be configured by machine-readable instructions 106. Machine-readable instructions 106 may include one or more instruction components. Executing the machine-readable instructions 106 may cause server(s) 102 to facilitate providing a game based on common media consumption. The instruction components may include computer program components. The instruction components may include one or more of consumption component 108, content component 110, game component 112, presentation component 114, and/or other instruction components.

The consumption component 108 may be configured to obtain sets of consumption information for users of a game. The sets of consumption information specifying individual sets of media content consumed by individual users. In some implementations, determine the sets of media content consumed by individual users may be based on access to one or more media content platform. A media content platform may include an on-demand online content platform. A media content platform may include a streaming media service, and/or other media content platforms. In some implementations, a media content platform may be integral to the system 100 (e.g., hosted by system 100). In some implementations, a media content platform may be an external resource accessed by the system 100 (e.g., via external resources 122). In some implementations, individual sets of media content consumed by individual users may be determined by querying user accounts and/or other information associated with the media content platforms. By way of non-limiting illustration, user accounts may store information such as previous watch history of the individual users associated with the individual user accounts.

In some implementations, media content consumed by the individual users includes media content partially consumed. In some implementations, partial consumption may be expressed by a measure of consumption. The measure may include one or more of percentage, specific description of consumed portions, and/or other measures. By way of non-limiting illustration, a percentage of consumption may include 50% consumption. For a movie, this may refer to a user watching half of the movie. A specific description of consumed portions may refer to the media content itself and/or portions thereof. By way of non-limiting illustration, a specific description of partially consumed media may include one or more of identification of scenes consumed, identification of characters encountered, and/or other information. By way of non-limiting illustration, an identification of scenes consumed may include "consumed media content through a scene where the villain captures the princess." By way of non-limiting illustration, an identification of characters encountered may include "consumed media content prior to when the identify of the villain is revealed." It is noted that the descriptions of partial consumption of media content are presented for illustrative purposes only. Instead, it is to be understood that a measure of consumption may be expressed in different ways.

Figure 3:
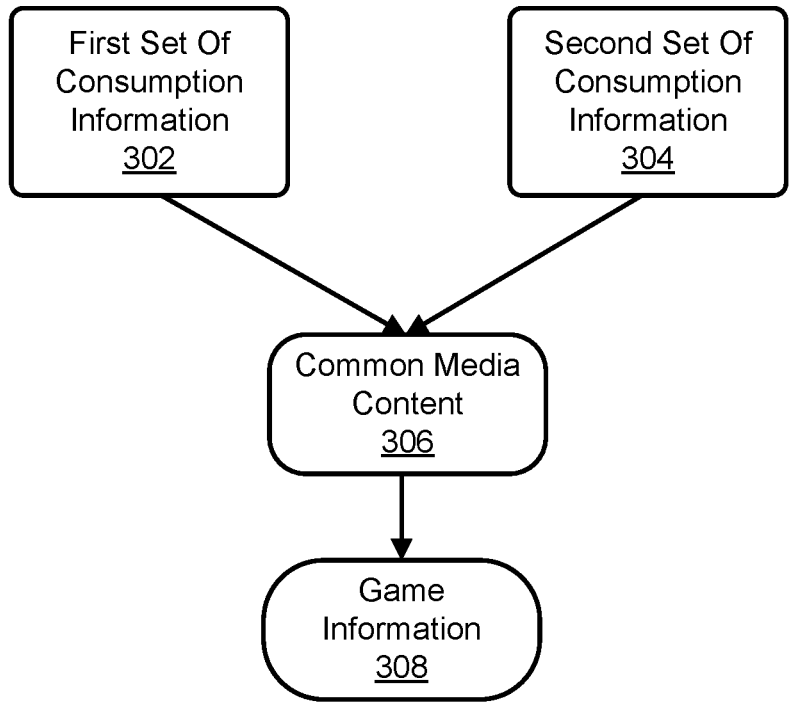
FIG. 3 illustrates a graphic of the system of FIG. 1, in accordance with one or more implementations.

By way of non-limiting illustration in FIG. 3, sets of consumption information may include one or more of a first set of consumption information 302 for a first user, a second set of consumption information 304 for a second user, and/or other sets of consumption information for other users. The first set of consumption information 302 may specify a first set of media content that has been consumed by the first user. The second set of consumption information may specify a second set of media content that has been consumed by the second user.

In some implementations, consumption information for media content may include one or more of an indication that the media content was consumed (and/or partially consumed), description of media content, and/or other information. The description of the media content may include one or more of identification information, actor information, production information, character information, story information, and/or other information.

Identification information may include identifications of the media content. Identifications may include one or more of name (e.g., title), nickname, creation date, publication date (or release date), publication demographics, and/or other information.

Actor information may include identifications of actors depicted in media content. Identification may include one or more of name, age, birthplace, height, weight, hobbies, filmography, nationality, and/or other information.

Production information may include identifications of persons, places, objects, and/or other entities associated with a production of media content. Persons may include one or more of owner, director, publisher, producer, editor, and/or other information. Places may include one or more real-world locations of real-world scenes (e.g., filming locations in the case of movies), fictious locations of fantasy and/or other fictious scenes, production office location, and/or other information. Objects may refer to quintessential real-world and/or fantasy objects associated with media content. Objects may include one or more of costumes, props, and/or other considerations.

Character information may include identifications of characters in media content. Characters may include characters depicted by actors, animated characters, and/or other considerations. Identification may include one or more of name, age, birthplace, height, weight, significant other status, backstory, and/or other information story information.

Story information may include one or more of thematic and/or narrative descriptions of media content. Thematic description may include one or more of a genre, theme(s) and/or topic(s) depicted and/or represented in media content, and/or other information. Narrative description may include one or more of character roles for characters, a storyline, plot description(s), and/or other information. A storyline may represent a sequence of events. Plot description(s) may include descriptions of one or more an introduction, rising action, climax, falling action, conclusion, and/or other information. Roles may include one or more of protagonist, deuteragonist, antagonist, love interest, mentor, narrator, secondary character, tertiary character, flat character, and/or other roles.

It is noted that the above descriptions of information included in consumption information is for illustrative purpose only is not to be considered limiting. Instead, it is to be understood that consumption information may include other information about media content.

Returning to FIG. 1, content component 110 may be configured to identify common media content that has been consumed by two or more users from the sets of consumption information for the two or more users. In some implementations, identifying common media content may be based on comparing identification information including the sets of consumption information for the sets of media content. Common media content may be identified based on identification information in two or more sets of consumption information matching. By way of non-limiting illustration in FIG. 3, common media content 306 between the first user, the second user, and/or other users may be identified. The common media content 306 between the first user, the second user, and/or other users may include media content that may be common between two or more of the first set of media content, the second set of media content, and/or other media content.

Returning to FIG. 1, game component 112 may be configured to obtain requests from users to play the game together. In some implementations, a request may be provided through input in a user interface. In some implementations, a request may be provided by initiated and/or access a game of the present disclosure. In some implementations, requests from users to play a game together may include concurrent requests. In some implementations, concurrent requests may be based on user intent to play the game together. Concurrent may mean contemporaneous in time.

Concurrent may mean within a threshold time period. By way of non-limiting illustration, users may submit a request to play the game and/or may identify other users they wish to play with (e.g., game "invitations" from a friends list). In some implementations, concurrent requests mean multiple users currently request to play the game, regardless of knowledge of the each other's presence. User may not be formally acquainted and/or aware of each other. By way of non-limiting illustration, request(s) from two or more of the first user, the second user, and/or other users to play the game together may be obtained.

Game component 112 may be configured to, responsive to requests from users to play the game together, obtain game information that corresponds to the common media content between the users requesting to play the game together. The game information corresponding to the common media content may define game content associated with the common media content. The game content may be associated with the common media content by virtue of the game content including one or more of content directly referencing the common media content, content tangentially referencing the common media content, and/or other game content.

Direct references of the common media content may generally refer to content which may be derived by consuming the common media content in a conventional manner. Game content directly referencing common media content may include one or more of content directed to one or more of identification information for the media content, character information, story information, and/or other information.

Tangential references of the common media content may generally refer to content which may be derived by means other than simply consuming the common media content in a conventional manner. By way of non-limiting illustration, tangential references may include information users may derive through further research, knowledge, and/or access of information beyond the mere consumption. Game content tangentially referencing the common media content may include content directed to one or more of actor information, production information, and/or other information.

In some implementations, the game content may include one or more trivia questions, a virtual space, and/or other game content. Other game content may include one or more of a multiplayer interactive gaming experiences, a single player gaming experience, and/or other game content. The trivia questions may test user knowledge with common media content and/or other content. By way of non-limiting illustration, a trivia question directly referencing common media content may include "Who is the main character of The Movie?". By way of non-limiting illustration, a trivia question tangentially referencing common media content may include "What is the maiden name of the actress in The Movie?". It is noted that the descriptions of trivia questions based on common media content are for illustrated purposes only and not to be considered limiting. Instead, it is to be understood that trivia questions may be formulated in other ways and/or present questions in other ways.

An instance of the virtual space may comprise a simulated space that is accessible by users via clients that present the views of the virtual space to a user. The simulated space may have a topography, express ongoing real-time interaction by one or more users, and/or include one or more virtual objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. By way of non-limiting illustration, a virtual space directly referencing common media content may include a topography that resembles a location of a scene in the media content. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

Within the instance(s) of a virtual space, users may control virtual objects, simulated physical phenomena (e.g., wind, rain, earthquakes, and/or other phenomena), and/or other elements within the interactive space to interact with the virtual space, other virtual objects, and/or other users. The virtual objects may include game entities such as avatars. As used herein, the term game entity may refer to a virtual object present in the interactive space that represents an individual user. A game entity may be controlled by the user with which it is associated. By way of non-limiting illustration, a virtual space directly referencing common media content may include a virtual object that resemble objects within the common media content. By way of non-limiting illustration, a virtual space tangentially referencing common media content may include a virtual character that resembles a producer of the common media content.

The user-controlled element(s) may move through and interact with the interactive space (e.g., non-user characters in the virtual space and/or other objects in the interactive space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the interactive space.

Control by users may be exercised through control inputs and/or commands input by the users. The users may interact with each other through communications exchanged within the virtual space. Such communications may include one or more of textual chat, instant messages, private messages, voice communications, and/or other communications. Communications may be received and entered by the users. Communications may be routed to and from the appropriate users through one or more physical processors 126 and/or through communications which are external to the system 100 (e.g., text messaging services).

The instance of the virtual space may be persistent. That is, the virtual space may continue on whether or not individual users are currently logged in and/or participating in the interactive space. A user who logs out of the interactive space and then logs back in some time later may find the virtual space has been changed through the interactions of other users with the virtual space during the time the user was logged out. These changes may include changes to the simulated physical space, changes in the user's inventory, changes in other users' inventories, changes experienced by non-player characters, changes to the virtual items available for use in the interactive space, and/or other changes.

In some implementations, electronic storage 124 may store a repository of game information defining game content for one or more media content. Game component 112 may be configured to obtain the game information defining the game content from the repository of game content. Obtaining the game information from the repository may include one or more of submitting queries identifying game content associated with common media content to the repository, obtaining responses including game content satisfying the queries, and/or other operations.

Game component 112 may be configured to generate the game information defining the game content in response to the identification of the common media content. In some implementations, generating game information defining the game content may include generating trivia questions based on the common media content.

By way of non-limiting illustration in FIG. 3, responsive to a request from the first user and, the second user, and/or other users to play the game together, first game information 308 and/or other information may be obtained. The first game information may correspond to the common media content between the first user, the second user, and/or other users. The first game information corresponding to the common media content 306 between the first user, the second user, and/or other users may define first game content and/or other content. The first game content may be associated with the common media content between the first user, the second user, and/or other users. The first game content may be associated with the common media content between the first user, the second user, and/or other users by virtue of the first game content directly referencing the common media content 306. The game content may be associated with the common media content 306 between the first user, the second user, and/or other users by virtue of the first game content referencing content tangential to the common media content 306. The game content may be associated with the common media content between the first user, the second user, and/or other users by virtue of including other game content.

Returning to FIG. 1, presentation component 114 may be configured to effectuate presentation of a user interface on individual client computing platforms of one or more client computing platforms 104. For example, the individual client computing platforms may access information to effectuate presentation of a user interface over network 116. A given user interface may be configured to present a game and/or facilitate user interaction with the game.

A user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input field, drop down menus, check boxes, display windows, virtual buttons, sliding scales, and/or other elements configured to facilitate user interaction.

A display portion may include display game content and/or other content. The game content may include one or more trivia questions, a virtual space, and/or other game content.

An input portion of a user interface may be configured to obtain user input comprising user entry and/or selection game elements of a game. Game elements may include one or more of answer selection, virtual objects and/or control elements thereof, and/or other elements. An input portion may comprise one or more text input fields, one or more check boxes, one or more drop down menus, one or more virtual buttons, and/or other user interface elements configured to accept user entry and/or selection of the game elements of a game.

Figure 4:
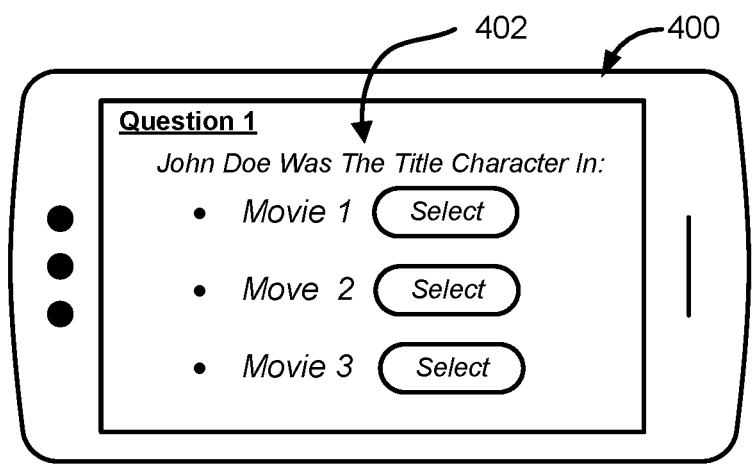
FIG. 4 illustrates a user interface, in accordance with one or more implementations.

FIG. 4 illustrates a user interface presented on a display of a computing platform 400. The user interface may display a game including game content 402 determined based on one or more computer program component described herein. The game content 402 may include, for example, trivia questions.

Returning to FIG. 1, game component 112 may be configured to monitor interactions with the game by users. Monitoring user interactions may include monitoring user entry and/or selection of game elements of a game. Monitoring user interaction with a game involving trivia questions may include assigning scores to users aggregating (e.g., adding) scores assigned to the users, and/or other operations. In some implementations, individual trivia questions may be associated with one or more points. A correct answer by a user may cause the user to be assigned the associated points. An incorrect answer by a user may cause the user to not be assigned points and/or may cause the user to be deducted the associated points. By way of non-limiting illustration, game component 112 may monitor game interactions with the game by the first user via the first computing platform and the second user via the second computing platform.

The game component 112 may be configured to determine game outcome based on the interactions. Game outcome may be determined based on score, points, and/or other measure of outcome. In some implementations, a user with a highest score may be determined a winner. In some implementations determining game outcome may involve eliminating those who get too many questions wrong, with a winner being the last player standing.

The game component 112 may be configured to modify the game content based on user interactions with the game. The game content may be modified while the users are interacting with the game. The game content may be modified such that that subsequent instance of gameplay may include the modified game content. In some implementations, modifying game content may include causing the game content to include more game content associated with media common more favorable to one or more users. In some implementations, game content may be modified to include game content associated with media content more favorable to one or more users who may be have the lesser amount of points. Media content more favorable to one or more users who may be have the lesser amount of points may include game content associated with media content the users who may be have the lesser amount of points may be more familiar with. This may result in a type of handicapping of the game to allow the users having a lesser amount of points to catch up in score.

By way of non-limiting illustration, the game played by the first user and second user may be modified while the first user and/or second user are interacting with the game.

In some implementations, game component 112 may be configured to generate recommendations for media content of individual users. Recommendations may include identification of media content which individual user may want to consume. In some implementations, the recommendations may be generated based on game outcome and/or other information. In some implementations, the recommendations may include identifications of media content associated with one or more of game content from which the user has achieved positive outcome (e.g., questions answered correctly), game content from which the user has not achieved positive outcome (e.g., questions answered incorrectly), and/or other information.

By way of non-limiting illustration, for a trivia game, if game outcome indicates that a user (or groups of users) gets questions related to particular media content correct, game component 112 may generate a recommendation to the user (or group of users) to consume the particular media content and/or related media content. For example, it may be likely the user (or group of users) may be fans of the particular media content and may be likely to continue consuming the media content and/or related media content.

By way of non-limiting illustration, for a trivia game, if game outcome indicates that a user gets questions related to particular media content incorrect, game component 112 may generate a recommendation to the user (or group of users) to consume different media content. For example, it may be likely the user was not particularly engaged in the particular media content during consumption. The user may be likely to consume the different media content. In some implementations, if game outcome indicates that a user gets questions related to particular media content incorrect, game component 112 may generate a recommendation to the user to consume the particular media content and/or related media content. For example, it may be likely the user was not particularly engaged in the particular media content during consumption, and such recommendations may inspire the user to consume the particular media content again.

In FIG. 1, in some implementations, server(s) 102, client computing platform(s) 104, and/or external resources 122 may be operatively linked via one or more electronic communication links. For example, such electronic communication links may be established, at least in part, via network(s) 103 such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

An individual client computing platform of one or more client computing platforms 104 may include one or more processors configured to execute computer program components. The computer program components may be configured to enable an expert or user associated with the individual client computing platform to interface with system 100 and/or external resources 122, and/or provide other functionality attributed herein to client computing platform(s) 104. By way of non-limiting example, the individual client computing platform may include one or more of a desktop computer, a laptop computer, a handheld computer, a tablet computing platform, a NetBook, a Smartphone, a gaming console, and/or other computing platforms.

External resources 122 may include sources of information outside of system 100, sources of game information, sources of media content, external entities participating with system 100, and/or other resources. In some implementations, some or all of the functionality attributed herein to external resources 122 may be provided by resources included in system 100.

Server(s) 102 may include electronic storage 124, one or more processors 126, and/or other components. Server(s) 102 may include communication lines, or ports to enable the exchange of information with network(s) 103 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 124 may comprise non-transitory storage media that electronically stores information. The electronic storage media of electronic storage 124 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 124 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 124 may include one or more virtual storage resources (e.g., cloud storage, a virtual private network, and/or other virtual storage resources). Electronic storage 124 may store software algorithms, information determined by processor(s) 126, information received from server(s) 102, information received from client computing platform(s) 104, and/or other information that enables server(s) 102 to function as described herein.

Processor(s) 126 may be configured to provide information processing capabilities in server(s) 102. As such, processor(s) 126 may include one or more of a digital processor, an analog processor, a digital circuit designed to process information, an analog circuit designed to process information, a state machine, and/or other mechanisms for electronically processing information. Although processor(s) 126 is shown in FIG. 1 as a single entity, this is for illustrative purposes only. In some implementations, processor(s) 126 may include a plurality of processing units. These processing units may be physically located within the same device, or processor(s) 126 may represent processing functionality of a plurality of devices operating in coordination. Processor(s) 126 may be configured to execute components 108, 110, 112, and/or 114, and/or other components. Processor(s) 126 may be configured to execute components 108, 110, 112, and/or 114, and/or other components by software; hardware; firmware; some combination of software, hardware, and/or firmware; and/or other mechanisms for configuring processing capabilities on processor(s) 126. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 126 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 126 may be configured to execute one or more additional components that may perform some or all of the functionality attributed below to one of components 108, 110, 112, and/or 114.

Figure 2:
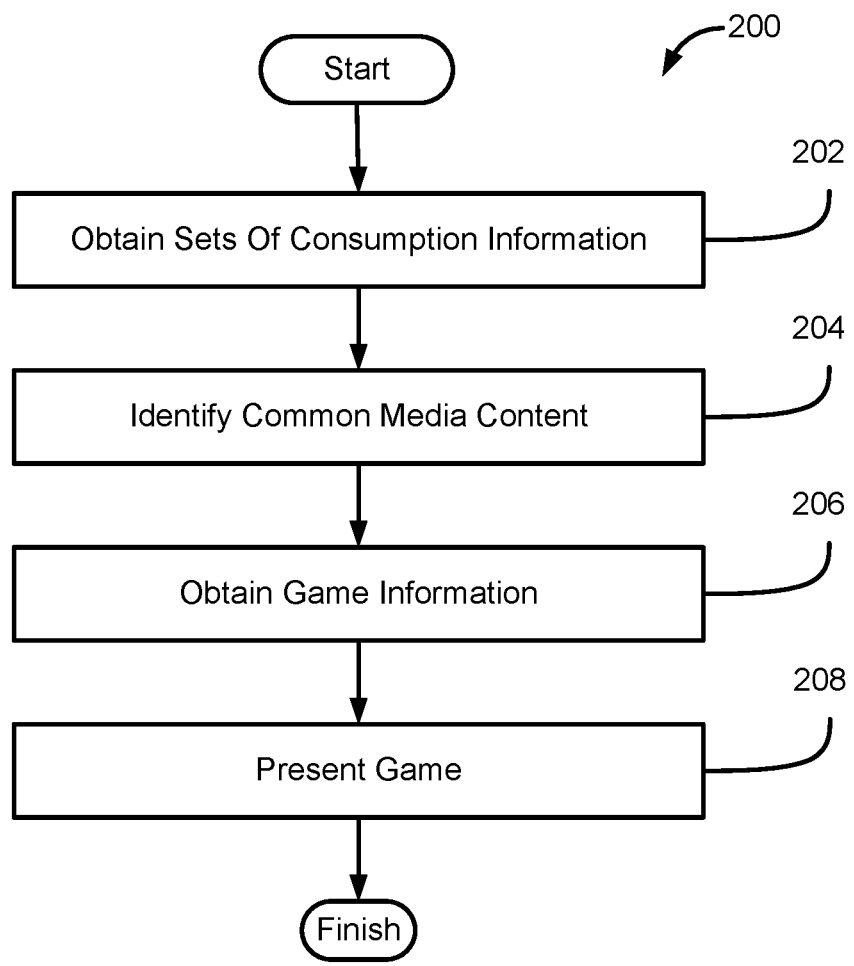
FIG. 2 illustrates a method to provide a game based on common media consumption, in accordance with one or more implementations.

FIG. 2 illustrates a method 200 to provide a game based on common media consumption, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining sets of consumption information for users of the game. The sets of consumption information may specify individual sets of media content consumed by individual users. By way of non-limiting illustration, the sets of consumption information may include one or more of a first set of consumption information for a first user, a second set of consumption information for a second user, and/or other sets of consumption information for other users. The first set of consumption information may specify a first set of media content that has been consumed by the first user. The second set of consumption information may specify a second set of media content that has been consumed by the second user. Operation 202 may be performed by one or more hardware processors configured by machine-readable instructions including a component that is the same as or similar to consumption component 108, in accordance with one or more implementations.

An operation 204 may include identifying common media content that has been consumed by two or more users from the sets of consumption information for the two or more users. By way of non-limiting illustration, common media content between the first user and the second user may be identified. The common media content between the first user and the second user may include media content that is common between the first set of media content and the second set of media content. Operation 204 may be performed by one or more hardware processors configured by machine-readable instructions including a component that is the same as or similar to content component 110, in accordance with one or more implementations.

An operation 206 may include, responsive to obtaining requests from users to play the game together, obtaining game information that corresponds to the common media content between the users requesting to play the game together. The game information corresponding to the common media content may define game content associated with the common media content. By way of non-limiting illustration, responsive to a request from the first user and the second user to play the game together, first game information defining first game content may be obtained. The first game content may be associated with the common media content between the first user and the second user. Operation 206 may be performed by one or more hardware processors configured by machine-readable instructions including a component that is the same as or similar to game component 112, in accordance with one or more implementations.

An operation 208 may include effectuating presentation of the game on computing platforms of the users based on the game information and/or other information. By way of non-limiting illustration, the game including the first game information may be presented on one or more of a first computing platform associated with the first user, a second computing platform associated with the second user, and/or other computing platforms. Operation 208 may be performed by one or more hardware processors configured by machine-readable instructions including a component that is the same as or similar to presentation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a game based on common media consumption, the system comprising:
   one or more physical processors configured by machine-readable instructions to:
      obtain sets of consumption information for users of a game, the sets of consumption information specifying individual sets of media content consumed by individual users, such that the sets of consumption information include a first set of consumption information for a first user and a second set of consumption information for a second user, the first set of consumption information specifying a first set of media content that has been consumed by the first user, and the second set of consumption information specifying a second set of media content that has been consumed by the second user;
      identify common media content that has been consumed by two or more users from the sets of consumption information for the two or more users, such that the common media content between the first user and the second user is identified, the common media content between the first user and the second user including media content that is common between the first set of media content and the second set of media content;

responsive to requests from the users to play the game together, obtain game information that corresponds to the common media content between the users requesting to play the game together, the game information defining game content associated with the common media content, such that responsive to a request from the first user and the second user to play the game together, first game information defining first game content associated with the common media content between the first user and the second user is obtained; and effectuate presentation of the game on computing platforms of the users based on the game information, such that the game including the first game information is presented on a first computing platform associated with the first user and a second computing platform associated with the second user.

2. The system of claim 1, wherein the game content is associated with the common media content by virtue of the game content including one or both of content directly referencing the common media content and/or content tangentially referencing the common media content, such that the first game content is associated with the common media content between the first user and the second user by virtue of the first game content directly referencing the common media content between the first user and the second user and/or referencing content tangential to the common media content between the first user and the second user.

3. The system of claim 1, wherein the media content includes one or more of movies, games, books, online videos and/or video clips, sporting events, memes, or news.

4. The system of claim 1, wherein the media content consumed by the individual users includes media content partially consumed.

5. The system of claim 1, wherein the game content includes trivia questions.

6. The system of claim 1, wherein the game information defining the game content is obtained from a repository of game content.

7. The system of claim 1, wherein the game information defining the game content is generated in response to the identification of the common media content.

8. The system of claim 1, wherein the one or more physical processors are further configured by the machine-readable instructions to:

monitor interactions with the game by the first user via the first computing platform and the second user via the second computing platform; and determine game outcome based on the interactions.

9. The system of claim 8, wherein the one or more physical processors are further configured by the machine-readable instructions to:

modify the first game content based on the interactions while the first user and second user are interacting with the game.

10. The system of claim 8, wherein the one or more physical processors are further configured by the machine-readable instructions to:

generate recommendations for media content based on the game outcome.

11. A method to provide a game based on common media consumption, the method comprising:

obtaining sets of consumption information for users of a game, the sets of consumption information specifying individual sets of media content consumed by individual users, the sets of consumption information including a first set of consumption information for a first user and a second set of consumption information for a second user, the first set of consumption information specifying a first set of media content that has been consumed by the first user, and the second set of consumption information specifying a second set of media content that has been consumed by the second user;

identifying common media content that has been consumed by two or more users from the sets of consumption information for the two or more users, including identifying the common media content between the first user and the second user, the common media content between the first user and the second user including media content that is common between the first set of media content and the second set of media content;

responsive to requests from the users to play the game together, obtaining game information that corresponds to the common media content between the users requesting to play the game together, the game information defining game content associated with the common media content, such that responsive to a request from the first user and the second user to play the game together, first game information defining first game content associated with the common media content between the first user and the second user is obtained; and effectuating presentation of the game on computing platforms of the users based on the game information, such that the game including the first game information is presented on a first computing platform associated with the first user and a second computing platform associated with the second user.

12. The method of claim 11, wherein the game content is associated with the common media content by virtue of the game content including one or both of content directly referencing the common media content and/or content tangentially referencing the common media content, such that the first game content is associated with the common media content between the first user and the second user by virtue of the first game content directly referencing the common media content between the first user and the second user and/or referencing content tangential to the common media content between the first user and the second user.

13. The method of claim 11, wherein the media content includes one or more of movies, games, books, online videos and/or video clips, sporting events, memes, or news.

14. The method of claim 11, wherein the media content consumed by the individual users includes media content partially consumed.

15. The method of claim 11, wherein the game content includes trivia questions.

16. The method of claim 11, wherein the game information defining the game content is obtained from a repository of game content.

17. The method of claim 11, wherein the game information defining the game content is generated in response to the identification of the common media content.

18. The method of claim 11, further comprising:
monitoring interactions with the game by the first user via the first computing platform and the second user via the second computing platform; and
determining game outcome based on the interactions.

19. The method of claim 18, further comprising:
modifying the first game content based on the interactions while the first user and second user are interacting with the game.

20. The method of claim 18, further comprising:
generating recommendations for media content based on the game outcome.

* * * * *